Dec. 6, 1955
D. D. MURPHY
2,725,757
SELF-TRAINING BELT CONVEYOR TERMINAL PULLEY
Filed April 7, 1953
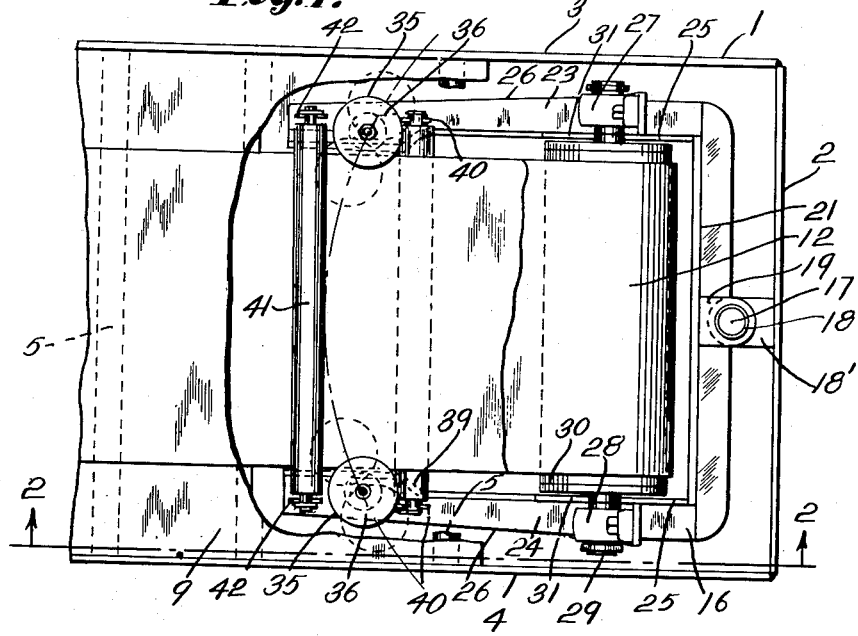
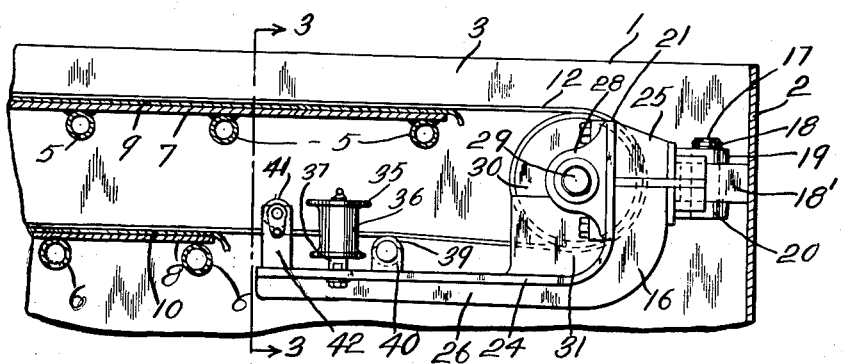
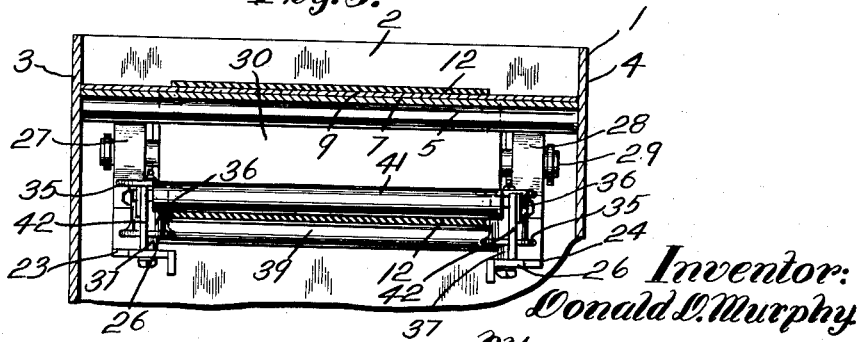
Inventor:
Donald D. Murphy
by
Louis A. Maxson.
Attorney.

United States Patent Office 2,725,757
Patented Dec. 6, 1955

2,725,757

SELF-TRAINING BELT CONVEYOR TERMINAL PULLEY

Donald D. Murphy, New Philadelphia, Ohio, assignor to Joy Manufacturing Company, Pittsburgh, Pa., a corporation of Pennsylvania Application April 7, 1953, Serial No. 347,319

9 Claims. (Cl. 74—240)

This invention relates to self-training belt conveyor tail or terminal pulley arrangements.

In an extensible belt conveyor system in which a tail pulley is mounted on a vehicle which follows closely after a Continuous Miner and a belt is extended from said pulley to a driving and storage arrangement on another vehicle, it is impracticable to mount the tail pulley for rotation on a fixed axis on its supporting vehicle. Moreover, in ordinary belt conveyors, in which crooked splices, etc. may force the belt off center, it is advantageous to provide a special arrangement for the tail pulley to return the belt to proper position and maintain proper belt alinement automatically.

It is an object of this invention to provide an improved tail pulley arrangement for belt conveyors. It is another object of the invention to provide an improved tail pulley arrangement for belt conveyors in which the edges of the return run of the conveyor belt cooperate with a pivoted tail pulley mounting in angling the tail pulley to effect return of the belt to centered position whenever it wanders or is thrown out of such position. It is a further object to provide an improved self-training belt conveyor terminal pulley arrangement in which belt wear shall be minimized and the edges of the belt, where they cooperate with guide rollers or the like shall be kept flat and stiff and prevented from folding. Other objects and advantages of the invention will hereinafter appear.

In a preferred embodiment of the invention, a tail or terminal pulley is supported for rotation on a horizontal axis on a support which is pivotable horizontally about an upright axis on a suitable frame; the support has a portion extending back along the return run of an associated conveyor belt just before the latter reaches the lower side of the tail pulley; and such portion supports upright belt guides engageable by the edges of the belt as the latter gets off center, there being provided on said portion suitable belt-constraining means—preferably a horizontal belt support roller and desirably also a horizontal hold-down roller, said rollers desirably being at opposite sides of said upright belt guides—in such relation to said upright belt guides that the belt is maintained flat and taut at its edges as the latter coact, in the displaced positions of the belt, with said upright belt guides. Desirably, by the extension of a lower deck plate on the frame relatively close to the adjacent end of the swingable support, additional assurance of adequate belt support during engagement with said upright belt guides may be provided.

In the accompanying drawings, in which one embodiment of the invention is shown for purposes of illustration, Fig. 1 is a top view, with a portion of the upper deck plate and the active run of the conveyor belt broken away, or a tail pulley and its mounting arranged according to the invention.

Fig. 2 is a longitudinal vertical section on the plane of the line 2—2 of Fig. 1, and Fig. 3 is a transverse vertical section on the plane of the line 3—3 of Fig. 2.

Referring to the drawings, a suitable frame is illustrated at 1. The details of the support of this frame are not shown, as it may be either a portion of the body of a vehicle adapted, for example, to follow along behind a Continuous Miner and receive material from the latter, such as is illustrated in the Baechli application, Serial No. 225,791, filed May 11, 1951, or a frame adapted to rest upon a mine floor or the like and constitute a tail pulley mounting for an ordinary belt conveyor. The frame 1 is illustrated as comprising a boxlike arrangement having an end 2, and opposite sides 3 and 4. The other end (not shown) is open for the belt conveyor to pass through it. Support elements 5 and 6 extend between the sides 3 and 4 and support upper and lower deck plates 7 and 8. These deck plates are provided with suitable overlying wear plates 9 and 10 to be engaged by and support the active and return runs of an endless conveyor belt 12. The lower deck plate 8 and wear plate 10 terminate materially farther from the end 2 than does the upper deck plate 7 and wear plate 9, but even the latter plates are spaced at their ends a substantial distance from the end 2.

A support element or yoke 16, which may be of any suitable shape and which is herein shown as generally L-shaped in side elevation (see Fig. 2) and U-shaped in plan (see Fig. 1), is pivotally supported for horizontal swinging about a vertical axis at 17 by means of a pivot pin 18 extending through a bracket 18' secured to the frame end 2 and through ears 19 and 20 fixed to the base portion 21 of the U-shaped support element or yoke 16. The yoke 16 has side arm portions 23 and 24 which have vertical portions 25 and horizontal portions 26. Journal boxes 27 and 28 are mounted on the vertical portions 25 of the side arm portions 23 and 24, and support and position a shaft 29 on which is mounted a tail pulley 30. Reinforcing plates 31 are connected to the vertical and horizontal side arm portions 25 and 26.

The tail pulley 30 is of an appropriate diameter for the belt 12 to pass from its upper side onto the wear plate 9 and for the lower, return run of the belt 12 to pass to its lower side.

The horizontal portions 26 extend fairly close to the lower deck plate structure and, as shown, support near their outer ends upright guides 35, 35 engageable by the edges of the belt 12, if the latter gets sufficiently off center. These upright guides each consist of a spool-like guide roller 36 suitably rotatably supported on upright spindles 37. The mid-points, vertically, of the spools are close to the plane of the upper surface of the wear plate 10, so that, when engagement of an edge of the belt 12 with one of these spools or rollers takes place, the engagement is with the portions of the latter midway between its ends.

To insure firm support of the edges of the belt 12 and to prevent their curling when they are in engagement with the upright guide rollers, means is provided on the arm portions 26 to provide guidance and support for the belt close to the guide rollers or spools 36. Preferably such means will be such as to prevent the edges of the belt from curling both downwardly and upwardly. A horizontal belt support member or roller 39, in a position to be firmly engaged by the lower side of the return run of the belt 12, is journaled suitably on brackets 40, one on each of the arm portions 26, and a horizontal belt hold-down member or roller 41, to coact with the upper side of the return run of the belt 12, is journaled suitably on brackets 42, one on each of the arm portions 26. To prevent jamming by dirt on the belt, the rollers 39 and 41 are preferably spaced from each other longitudinally of the belt, and a desirable arrangement is to locate them at opposite sides of the planes of the axes of the upright guides. Herein the roller 39 is shown positioned on the arm portions 26 adjacent the sides of the upright guide rollers nearer the tail pulley 30 and the roller 41 is shown positioned on the arm portions 26 adjacent the sides of the upright guide rollers farther from the tail pulley 30.

The mode of operation of this improved tail pulley arrangement will be clear. If, as in the case of a portable extensible belt conveyor, there is a movement of a cat-mounted tail section of which the frame 1 forms a part laterally out of line with an associate belt drive and storage unit, the pivotal mounting of the yoke on a vertical axis will prevent disturbance of the belt training. And, provided the frame is properly alined, when it is a portion of a standard conveyor, with the center of the pulley frame on the center line of the belt at installation, the pulley mounting would maintain proper belt alinement.

With the tail section proper in any static position within the limits of the pulley mounting, wandering of the belt from the center of the pulley is constantly corrected as necessary by the guide rollers, which when forced to one side swing the frame 1 and angle the tail pulley 30 and so effect a return of the belt to centered position.

The horizontal support rollers 39 and 41 adjacent the guide rollers constrain and stiffen the belt edges and prevent any excessive belt tension from curling or folding the edge of the belt against the guide rollers. This is particularly important in the case of light, thin belts. The provision of the horizontal rollers 39 and 41 also assures engagement of the edges of the bottom run of the belt with the central portions of the upright guide rollers when the belt is forced off center.

It will be evident from what has been said that an effective belt conveyor terminal pulley has been disclosed and that not only does its construction insure automatic centering of the belt when the latter wanders or is thrown off center, as by a crooked belt splice, but that also effective cooperation with the upright guide rollers by the belt is assured while at the same time the belt is protected to a maximum degree against destructive flexing and wear at its edges.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim is:

1. In combinbation, a frame, a support element, a pivotal connection on an upright axis between said frame and said support element for supporting the latter for lateral swinging movement about such axis, a belt direction reversing tail pulley journaled on said support element for rotation on a horizontal axis, upright belt guides on and at the opposite sides of said support element near the end of the latter remote from said upright axis and more remote from the latter than is said tail pulley, and means adjacent said upright belt guides for constraining the return run of a belt both from above and from beneath to travel between the upper and lower ends of said upright belt guides.

2. In combination, a frame, a support element, a pivotal connection on an upright axis between said frame and said support element for supporting the latter for lateral swinging movement about such axis, a belt direction reversing tail pulley journaled on said support element for rotation on a horizontal axis, upright belt guides on and at the opposite sides of said support element near the end of the latter remote from said upright axis and more remote from the latter than is said tail pulley, and means on said support element adjacent said upright belt guides for supporting the return run of a belt at an elevation between the upper and lower ends of said upright belt guides.

3. In combination, a frame, a support element, a pivotal connection on an upright axis between said frame and said support element for supporting the latter for lateral swinging movement about such axis, a belt direction reversing tail pulley journaled on said support element for rotation on a horizontal axis, upright belt guides on and at the opposite sides of said support element near the end of the latter remote from said upright axis and more remote from the latter than is said tail pulley, and means on said support element adjacent said upright belt guides for holding down the return run of a belt to travel between the upper and lower ends of said upright belt guides.

4. In combination, a frame, a support element, a pivotal connection on an upright axis between said frame and said support element for supporting the latter for lateral swinging movement about such axis, a belt direction reversing tail pulley journaled on said support element for rotation on a horizontal axis, upright belt guides on and at the opposite sides of said support element near the end of the latter remote from said upright axis and more remote from the latter than is said tail pulley, and means on said support element adjacent said upright belt guides for maintaining a belt in a position between the upper and lower ends of said upright belt guides.

5. In combination, a frame, a support element, a pivotal connection on an upright axis between said frame and said support element for supporting the latter for lateral swinging movement about such axis, a belt direction reversing tail pulley journaled on said support element for rotation on a horizontal axis, upright belt giudes at the opposite sides of said support element on and near the end of the latter away from said upright axis, and means on said support element adjacent said upright belt guides for supporting a belt at points between the upper and lower ends of said upright belt guides.

6. In combination, a frame, a yoke comprising a base and arms projecting generally horizontally from said base, a pivotal connection on an upright axis between said base and said frame for supporting said yoke for lateral swinging movement, a belt direction reversing tail pulley journaled on a horizontal axis on said yoke near said base, guide rollers on said arms rotatable on upright axes near the free ends of said arms and having guide surfaces disposed to be engageable by the edges of the return run of a belt passing around said tail pulley, and a horizontal belt idler extending between said arms and rotatably supported by the latter in adjacency to said guide rollers with its side adjacent the belt at a level between the top and bottom of the guide surfaces of said guide rollers.

7. In combination, a frame, a yoke comprising a base and arms projecting generally horizontally from said base, a pivotal connection on an upright axis between said base and said frome for supporting said yoke for lateral swinging movement, a belt direction reversing tail pulley journaled on a horizontal axis on said yoke near said base, guide rollers on said arms rotatable on upright axes near the free ends of said arms and having guide surfaces disposed to be engageable by the edges of the return run of a belt passing around said tail pulley, and horizontal belt engaging idlers extending between said arms and rotatably supported by the latter in adjacency to said guide rollers with the upper side of one of said horizontal idlers positioned to engage the lower side of the return run of the belt and the lower side of the other one of said idlers positioned to engage the upper side of the return run of the belt.

8. In combination, a frame having upper and lower belt support decks respectively for the active and return runs of an endless conveyor belt, a yoke for supporting a tail pulley, a belt direction reversing tail pulley journaled on said yoke for rotation thereon on a horizontal axis, a pivotal supporting connection between said yoke and said frame for supporting said yoke with said tail pulley in a position for the return run of a conveyor belt to pass horizontally from said lower deck plate to the lower side of said tail pulley and for the active run to extend between the upper side of said tail pulley horizontally onto said upper deck plate, said upper deck plate extending into adjacency to said tail pulley and said lower deck terminating substantially short of said tail pulley, said yoke having arms extending towards said lower deck plate and carrying a horizontal guide roller in a position to contact the return run of said belt between said lower deck plate and the engagement of said return run with said tail pulley, and guide rollers supported by said arms for rotation on vertical axes adjacent said horizontal guide roller and having guide surfaces for engagement by the edges of the return run of the belt.

9. In combination, a frame having upper and lower belt support decks respectively for the active and return runs of an endless conveyor belt, a yoke for supporting a tail pulley, a belt direction reversing tail pulley journaled on said yoke for rotation thereon on a horizontal axis, a pivotal supporting connection between said yoke and said frame for supporting said yoke with said tail pulley in a position for the return run of a conveyor belt to pass horizontally from said lower deck plate to the lower side of said tail pulley and for the active run to extend between the upper side of said tail pulley horizontally onto said upper deck plate, said upper deck plate extending into adjacency to said tail pulley and said lower deck plate terminating substantially short of said tail pulley, said yoke having arms extending towards said lower deck plate and carrying a horizontal guide roller in a position to contact and support the return run of said belt between said lower deck plate and the engagement of said return run with said tail pulley, a second horizontal guide roller in a position to contact and hold down such return run between said lower deck plate and the engagement of said return run with said tail pulley, and guide rollers supported by said arms for rotation on vertical axes adjacent said first mentioned horizontal guide roller and between the latter and said lower deck plate and having guide surfaces for engagement by the edges of the return run of the belt.

References Cited in the file of this patent
UNITED STATES PATENTS

| 745,691 | Thompson | Dec. 1, 1903 |
| 992,568 | Loutensock | May 16, 1911 |
| 1,179,602 | Bernheim | Apr. 18, 1916 |
| 2,532,987 | Berndt | Dec. 5, 1950 |